L. L. ROWE.
AUTOMATIC VALVE.
APPLICATION FILED JUNE 16, 1910.

1,053,956.

Patented Feb. 18, 1913.

UNITED STATES PATENT OFFICE.

LEVI L. ROWE, OF BOSTON, MASSACHUSETTS.

AUTOMATIC VALVE.

1,053,956.　　　　Specification of Letters Patent.　　Patented Feb. 18, 1913.

Application filed June 16, 1910. Serial No. 567,180.

*To all whom it may concern:*

Be it known that I, LEVI L. ROWE, of Boston, in the county of Suffolk and State of Massachusetts, a citizen of the United States, have invented an Improved Automatic Valve, of which the following is a specification.

My invention is shown embodied in a valve to be operated by a float, but certain of its features are not necessarily limited to a valve of that kind. Moreover as shown it is especially designed for use in chocolate and other like urns where the water is to be kept at a normal height, but its principles may be involved in a valve for use in tanks of other kinds where a valve of this class is desirable.

My invention relates especially to the valve proper and the means for adjusting it and for directing the flow of water into the tank—and it will be understood by reference to the drawings which show one embodiment thereof.

Figure 1:
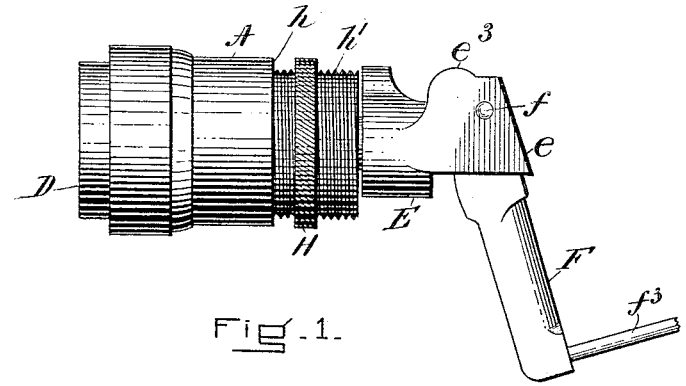
Figure 2:
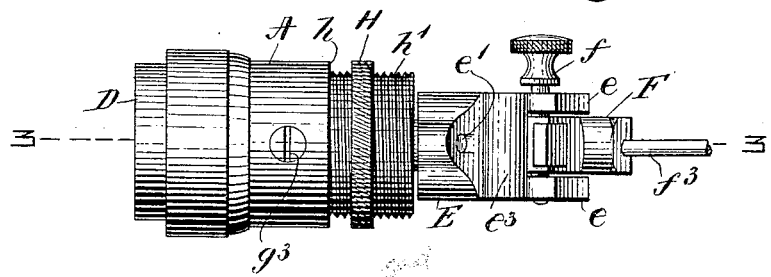
Figures 3, 4:
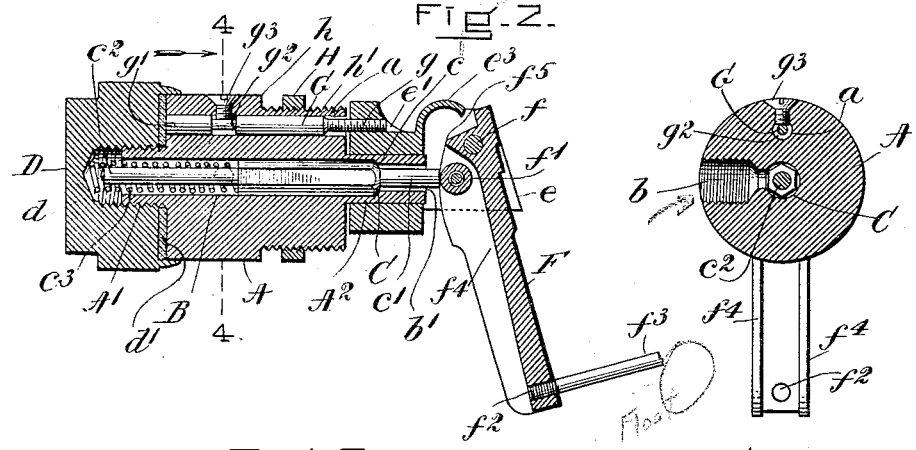

Figure 1 is a side elevation of a valve embodying my invention. Fig. 2 is a plan. Fig. 3 is a section on line 3—3 of Fig. 2, and Fig. 4 is a section on line 4—4 of Fig. 3.

A is the valve casing having a valve chamber B connected with a water supply by the opening $b$ threaded on its interior to receive the necessary coupling. This valve chamber B is contracted at one end to form a valve seat $c$ against which the valve C seats and it continues beyond the valve seat as the passage $b^1$. The valve C has a stem $c^1$ which projects through the opening surrounded by the valve seat $c$ and the passage $b^1$ and out beyond the end of the casing. Its diameter is somewhat less than that of the passage to allow a flow of water through the passage when the valve is open. The body of the valve is polygonal in cross section to allow the water to pass it, its angles having sufficient reach to engage the walls of the valve chamber and keep the valve properly centered. It has a stem $c^2$ which projects rearwardly, being reduced in diameter and surrounded by a spring $c^3$ which at one end bears against the valve body and at the other end engages the cap D, into a recess $d$ in which both the stem $c^2$ and spring $c^3$ protrude, the cap thus forming an abutment for the spring.

The rear end of the casing A is reduced in diameter as at $A^1$ and threaded on its exterior so that the cap D may be screwed onto it as shown. A washer $d^1$ is used to pack the joint between the cap D and the casing A.

E is a collar carrying lugs $e$ between which the arm F is pivoted by the pin $f$ which has a head at one end and a threaded section at its other end to screw into a screw hole in one of the lugs. To the arm F the float rod $f^3$ is attached. The collar E is adapted to slide on the part $A^2$, which projects from the front of the casing A and is reduced in diameter as shown. This collar has a hood $e^3$ projecting upwardly and outwardly therefrom to direct downward the water passing through the passage $b^1$.

The arm F is provided with means such as a roll $f^1$ which is located below the pivot $f$ and in position to engage the end of the valve stem $c^1$, this arrangement being such that when the arm is brought into nearly vertical position the valve C will be opened, but when the arm is in the position shown in the drawing the valve will be closed. The arm also has in its lower end an opening $f^2$ so that the float rod $f^3$ may be attached to it. This arm has side walls $f^4$, $f^4$ which coöperate with it to form a three-sided trough or conductor to direct the water delivered from the passage $b^1$ downward into the receptacle or such part thereof as is intended to receive it. The upper end of the arm is provided with an overhang $f^5$ to coöperate with the hood $e^3$ for the purpose of directing the water downward, these two parts preventing the escape of a stream of water upward when the arm has opened the valve.

In order to adjust the position of the roll $f^1$ with relation to the end of the valve stem and so adjust the opening point of the valve, I provide the casing A with a passage $a$ in which there is a screw rod G. One end of the rod is threaded as at $g$ and screws into a threaded opening $e^1$ in the collar E. The other end is notched as at $g^1$ to receive a screw-driver. Between these two portions of the rod G it is reduced in size to form shoulders $g^2$ and a screw $g^3$ screwed into a suitable opening in the casing projects into the cavity between the shoulders to prevent endwise movement of the rod G when it is turned. Thus the turning of the rod moves the collar E in or out as the case may be and so adjusts the position of the roll $f^1$ that the valve will open when the float reaches any desired level.

The casting A has a shoulder $h$ and a threaded nut $h^1$ projecting beyond the shoulder on which runs the clamp nut H. This nut is adapted to clamp the shoulder $h$ of the valve against a wall or other support in order to hold the valve in proper position.

The above describes the best embodiment of my invention known to me, but it may be otherwise embodied. It relates primarily to the simplification of the valve mechanism whereby a valve having a ground joint may be used in place of a valve having a washer to impinge against the valve seat. The objection to a washer is that it soon wears out so that the valve leaks. Any leak in the present case may be rectified by removing the valve and regrinding it. Moreover if any substance be caught between the valve and valve seat so that the valve will not close tightly, the valve may be held open so that the water will rush by it, in which case the water will soon wash the foreign substance away. In the case of a valve provided with a washer the foreign substance is apt to become slightly embedded in the washer so that a new washer has to be substituted for the old. My invention also relates to means for adjusting the relations of the ball cock and opening point of the valve without taking the device apart, which means I believe to be radically new.

What I claim as my invention is:—

1. In a valve structure of the kind described, a valve chamber having an opening at one end, a valve seat surrounding said opening, a valve coöperating with said seat to close said opening, said valve having a stem projecting through said opening, and adjustable means for controlling the movements of said valve comprising a sliding member, and a lever pivoted thereto, and means adapted to direct the movements of said sliding member in a right line whereby the fulcrum of said lever will always be maintained at the same angle relative to the vertical.

2. In a valve structure of the kind described, a valve casing, a valve chamber located therein having a valve and a valve seat, said valve having a stem projecting through the opening in said valve seat, a collar mounted on said casing, an arm mounted on said collar to engage said valve stem and means for adjusting the position of said collar to position said arm with relation to said stem, said means comprising a threaded rod free to move in said casing and engaging a threaded hole in said collar, and means for preventing the longitudinal movement of said rod with relation to said casing.

3. In a valve structure of the kind described, a valve chamber having a valve and a valve seat located therein and means for normally holding the valve on its seat, said valve having a stem projecting forward through the valve opening and means for automatically opening said valve and for allowing it to close, said means comprising a lever adapted to engage said valve stem, the axis of the pivot of said lever being in a line at right angles to the axis of said valve stem, and means for adjustably directing the delivery of water through said valve opening comprising walls carried by said lever arm and forming with said lever arm a channel for said water, and means for adjusting the location of said pivot whereby the angle of said lever arm to the axis of said valve opening will be adjusted.

LEVI L. ROWE.

Witnesses:
M. E. FLAHERTY,
GEORGE LANGTON.

Copies of this patent may be obtained for five cents each, by addressing the "Commissioner of Patents, Washington, D. C."